(12) United States Patent
Lutz

(10) Patent No.: US 7,083,197 B2
(45) Date of Patent: Aug. 1, 2006

(54) LOCKING DEVICE FOR TWO DISPLACEABLE RELATIVE TO EACH OTHER COMPONENTS

(75) Inventor: Christian Lutz, Nüziders (AT)

(73) Assignee: Thyssenkryp Presta Aktiengesselschaft, Eschen (LI)

(*) Notice: Subject to any disclaimer, the term of this patent is extended or adjusted under 35 U.S.C. 154(b) by 282 days.

(21) Appl. No.: 10/648,098

(22) Filed: Aug. 26, 2003

(65) Prior Publication Data
US 2004/0041387 A1    Mar. 4, 2004

(30) Foreign Application Priority Data
Aug. 28, 2002 (DE) ............... 102 40 235

(51) Int. Cl.
B62D 1/18 (2006.01)
F16B 21/02 (2006.01)
F16D 1/00 (2006.01)

(52) U.S. Cl. .................. 280/775; 403/321
(58) Field of Classification Search ........ 280/775; 74/493; 403/321–325, 373
See application file for complete search history.

(56) References Cited

U.S. PATENT DOCUMENTS

| RE34,381 E | * | 9/1993 | Barnes ............. 24/573.11 |
| 5,595,399 A | * | 1/1997 | Fouquet et al. ........ 280/777 |
| 5,787,759 A | | 8/1998 | Olgren |
| 5,893,676 A | * | 4/1999 | Yamamoto et al. ...... 403/325 |
| 5,988,679 A | | 11/1999 | Shelling et al. |
| 6,139,057 A | | 10/2000 | Olgren |
| 6,390,717 B1 | * | 5/2002 | Bar ..................... 403/104 |

FOREIGN PATENT DOCUMENTS

| DE | 3619125 | 10/1987 |
| DE | 3914608 | 10/1990 |
| DE | 9542472 | 2/1997 |
| DE | 0130587 | 1/2000 |
| DE | 9839496 | 3/2000 |
| DE | 9846292 | 4/2000 |
| DE | 9915341 | 10/2000 |
| EP | 0440403 | 8/1991 |
| EP | 0755842 | 1/1997 |
| EP | 0796780 | 9/1997 |

* cited by examiner

Primary Examiner—Paul N. Dickson
Assistant Examiner—Laura B. Rosenberg
(74) Attorney, Agent, or Firm—Abelman, Frayne & Schwab

(57) ABSTRACT

A locking device for two, displaceable relative to each other, components having arranged opposite each other, toothed racks having each teeth located alongside each other, with the locking device including at least one displaceable against a spring-biasing force, operating element provided on at least one of the opposite toothed racks for preventing tips of the teeth of the opposite toothed racks being located opposite each other during closing of the clamping device, the operating element having at least one tooth a tip of which projects beyond a plane of tips of the teeth of the at least one of the opposite racks in an outwardly preloaded position of the operating element, and is located opposite a side flank of a tooth of another of the opposite toothed racks when the tips of the teeth of the opposite racks are located opposite each other.

22 Claims, 8 Drawing Sheets

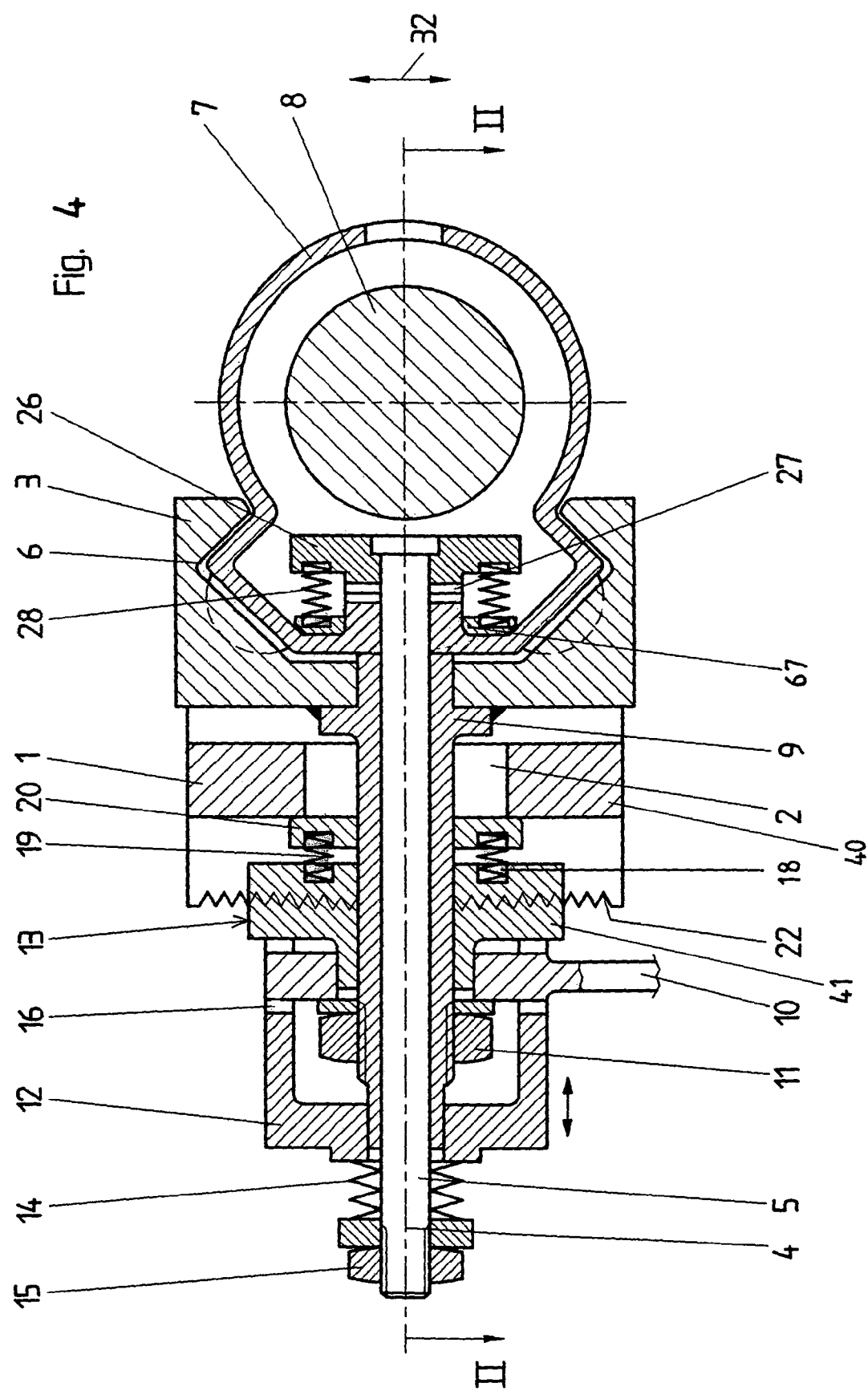

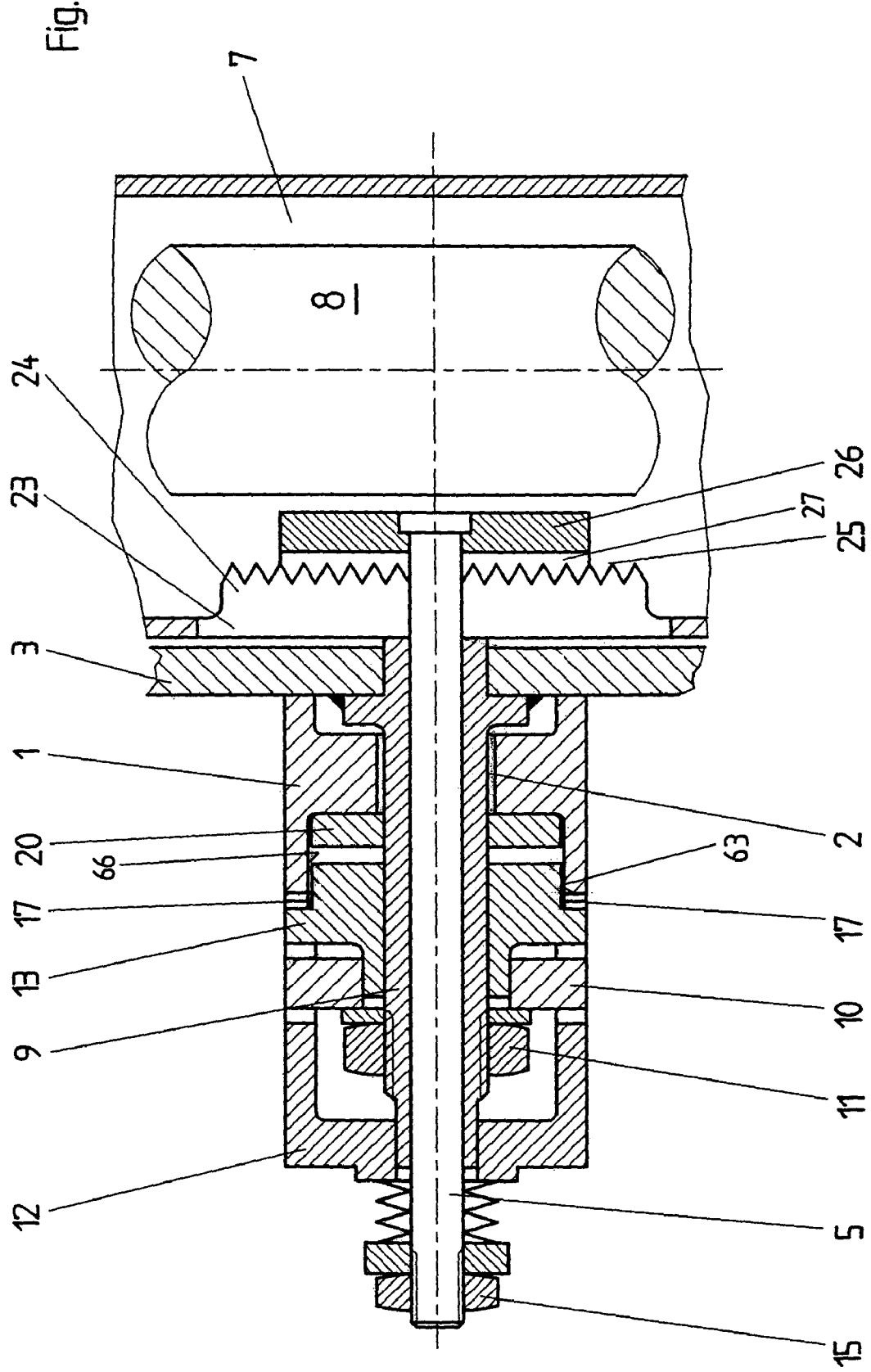

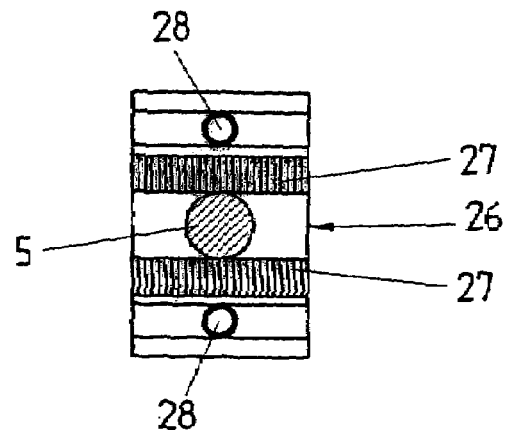
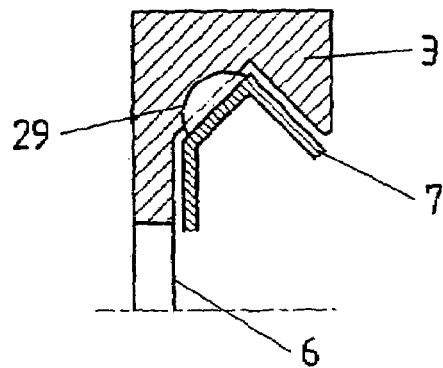
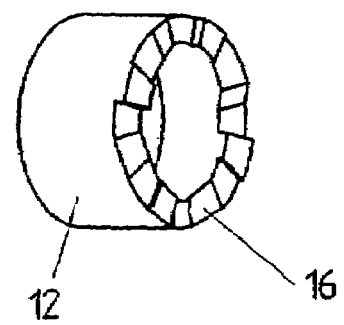

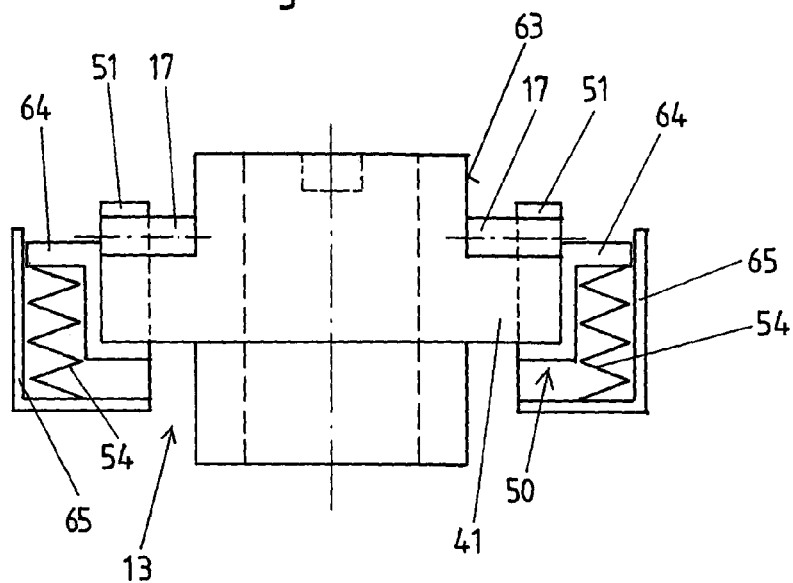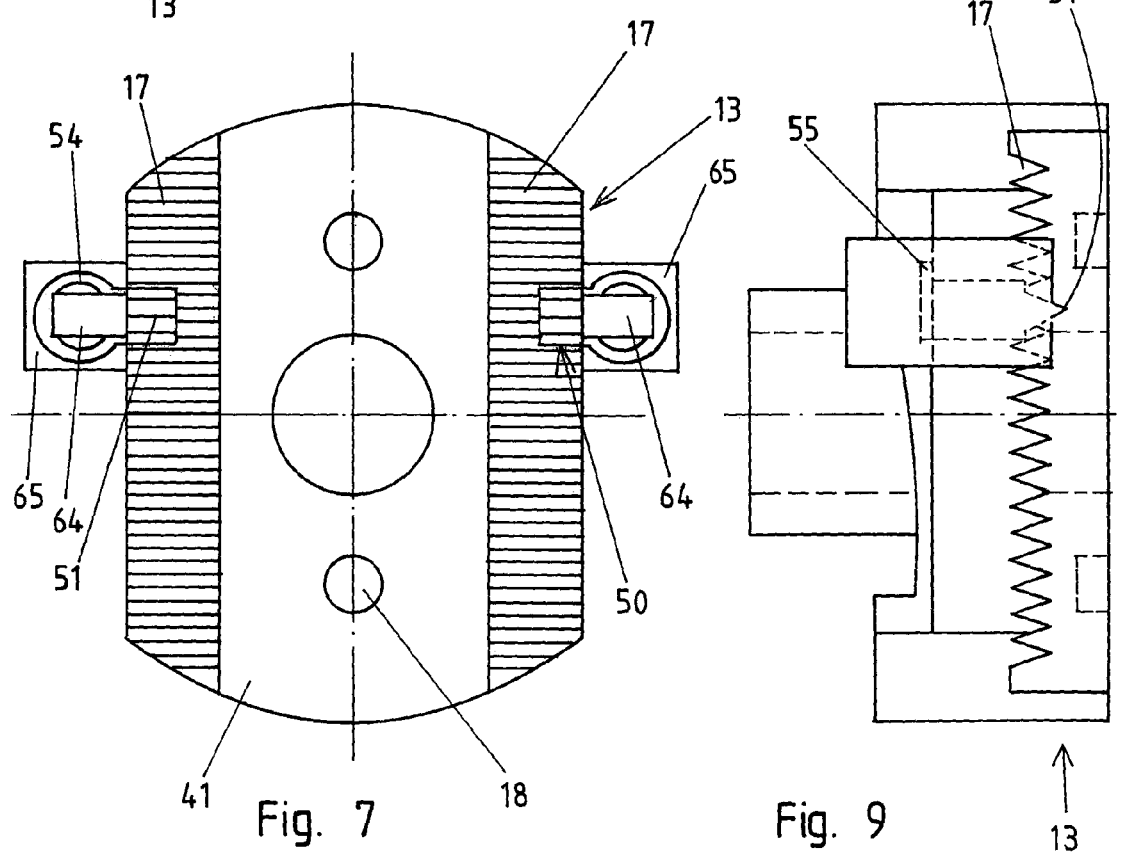

ly of tips of teeth of another of the opposite toothed racks relative to the at least one tooth, with the result that the tip of the at least one tooth of the operating element becomes offset relative to the tip of the another of opposite toothed racks, and the operating element is displaced into the at least one of the opposite toothed racks against a biasing force of a biasing spring. Upon a further displacement of the two components toward each other, the tips of the teeth of the two racks engage a respective tooth gap of the opposite toothed rack, and their formlocking engagement becomes possible.

LOCKING DEVICE FOR TWO DISPLACEABLE RELATIVE TO EACH OTHER COMPONENTS

BACKGROUND OF THE INVENTION

1. Field of the Invention

The present invention relates to a locking device for two, displaceable relative to each other components, in particular to components of a height-adjustable or inclination-and/or length-adjustable steering column and having arranged opposite each other, toothed racks having each tooth located alongside each other, including a clamping device which provides for movement of the two components toward each other so that teeth of the opposite toothed racks are brought into engagement with each other, and in an open position of which, the opposite toothed racks are spaced from each other and the two components can be displaced relative to each other; and at least one, displaceable against a spring biasing force, operating element provided on at least one of the opposite toothed racks for preventing tips of the teeth of the opposite toothed racks being located opposite each other during closing of the clamping device.

2. Description of the Prior Art

The use of toothed racks for locking height adjustable or inclination-and/or length-adjustable steering columns in different adjustable positions is well known. The steering columns of this type are disclosed in European Publications EP 0 836 981 B1; EP 0 440 403 B1; EP 0 755 842 B1 and German Publications DE 36 19 125 C2 and DE 195 42 472. The use of formlocking elements, in particular in form of toothed racks, permits to obtain a relatively inexpensive and reliable construction for applying necessary holding forces to a steering column in its locking condition. Nevertheless, with the construction in which toothed racks are used, at certain adjustments of two components relative to each other, problems can be encountered during regular locking of the components in their desired adjusted position. These problems appear when the tips of the teeth of two toothed racks are located directly opposite each other, in a so-called "head-to-head" position. If in this position of both components, the locking device is closed with a clamping device, the clamping device would be blocked or it could actually be closed but the tips of the teeth of the toothed racks would engage each other, and no formlocking engagement would take place. Thus, the clamping device should be open, the two components should be shifted relative to each other, whereby the tips of teeth of the two toothed racks become offset, and the clamping device should be closed again. In a worst case scenario, in case of an accident, with only seemingly closed position of the locking device, an uncontrolled relative movement between steering column components could take place, which would present a danger to a driver.

Already, different devices have been proposed for preventing the "head-to-head" position of the tips of the teeth of the toothed racks during closing of the locking device. DE 198 39 496 A1 and U.S. Pat. No. 5,787,759 disclose a device in which for preventing the "head-to-head" position of tips of mating teeth, one of the components which are provided with cooperating toothed racks, is pivotally supported. Upon displacement of the two components toward each other, the pivotally supported component pivots about an axis extending parallel to the engagement plane of the teeth and parallel to the longitudinal extent of the teeth. In a device of the German Publication DE 39 14 608 C1, there is provided a locking element displaceable in a direction toward engagement plane and pivotable about an axis extending parallel to longitudinal extent of the teeth. This device is relatively expensive and has a complicated construction, without completely eliminating a danger of the tips of the teeth being located opposite each other under any conditions.

In the locking device disclosed in German Publication DE 198 46 292, the two, located opposite each other, toothing racks are provided with magnets the magnetic forces of which provide for displacement of the adjacent free tips of the teeth away from each other. In order to provide for displacement of the two components when the tips of the teeth of both toothed racks are located opposite each other, with these magnetic devices, relatively high magnetic forces must be applied, which is associated with increased costs.

Another locking device for two, displaceable relative to each other, components provided with cooperating toothed racks is disclosed in European Publication EP 0 796 780 A2. In this device, there is provided a guide pin that is aligned parallel to the plane of the tips of the teeth and to the longitudinal extent of the teeth. The guide pin cooperates with a side guide surface provided on one of the two components. The guide surface has an inclination that corresponds somewhat to the inclination of a tooth. The guide pin is preloaded with a spring-biased clamp and occupies a position in which it extends beyond the tips of the teeth. When the toothed racks occupy a position in which the tips of the teeth are in "head-to-head" position when the two components are displaced toward each other, the guide pin extends between two teeth of the opposite toothed rack and is displaced along the guide surface, whereby the guide pin compulsory displaces sidewise the toothed rack it is associated with.

During the closing of the locking device in a position of the toothed racks in which the tips of heir respective teeth are located directly opposite each other, the toothed rack with the guide pin is displaced so far that engagement of the teeth of the two racks becomes possible. Nevertheless, even with this device, the toothed racks can occupy a position in which the guide pin is located opposite a tip of a tooth of the opposite rack, which would prevent a complete engagement of mating teeth during closing of the locking device, as the teeth of the opposite toothed racks would engage each other in the regions of their tips, preventing further displacement of the two components toward each other.

Accordingly, an object of the present invention is a locking device of the type discussed above which would insure a complete engagement of the teeth of the opposite toothed racks during closing of the locking device in any initial position of the components.

SUMMARY OF THE INVENTION

This and other objects of the present invention, which will become apparent hereinafter, are achieved by providing an operating element having at least one tooth a tip of which projects beyond a plane of tips of the teeth of the at least one of the opposite racks in an outwardly preloaded position of the operating element, and is located opposite a side flank of a tooth of another of the opposite toothed racks when the tips of the teeth of the opposite racks are located directly opposite each other.

With the inventive operating element, when the clamping device is closed in a "head-to-head" position of the teeth of the two racks, the tip of the at least one tooth of the operating element engages the side flank of the tooth of the toothed rack of the other component and provides for displacement of both components relative to each other in a direction parallel to the plane of the tips of the teeth, whereby the tip of the at least one tooth of the operating element slides downwardly along the side flank of the respective tooth of the opposite tooth rack until it reaches bottom of a valley between two teeth. As a result, the operating element is displaced inwardly in a direction perpendicular to the plane of the tips of the teeth of the toothed rack of the component the operating element is associated with. The operating element is displaced against a spring-biasing force until the teeth of the two racks completely engage each other. The biasing force applied by the preloaded spring to the operating element is so selected that the two components are displaced sidewise relative to each other before the operating element is displaced against the spring-biasing force inwardly. When the relative position of the two components, during closing of the clamping device, is such that the tip of the at least one tooth of the operating element is located directly opposite a tip of a respective tooth of the opposite toothed rack, the operating element is displaced inwardly, without first displacing the components sidewise relative to each other, and the teeth of the two racks are displaced in engagement with each other, as if the operating element did not exist.

In a preferred embodiment of the present invention, one of the side flanks of the tooth of the operating element is formed less steep than the other side flank. Preferably, the side flank of a teeth of the opposite tooth rack, which is designed to abut the less steep flank of the at least one tooth of the operating element, likewise is provided with a less steep inclination at least in the section adjoining the tip of the respective tooth. By providing a less steep side flank of the at least one tooth of the operating member and/or a less steep section of the cooperating side flank of the respective tooth of the opposite toothed rack, the displacement of the operating member under pressure inward is substantially facilitated during closing of the clamping device in a position of the components in which a sidewise displacement of the component relative to each other is not necessary.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 4 a cross-sectional view of the locking device according to the present invention, together with elements of a steering column;

FIG. 5 a cross-sectional view along line II—II in FIG. 4;

FIG. 6 a bottom view of shaped member;

FIG. 7 a top view of the connecting link including the toothed racks in which the inventive operating elements are supported;

FIG. 8 a side view of the connecting link shown in FIG. 7;

FIG. 9 a front view of the connecting link shown in FIGS. 7–8;

FIG. 10 a view showing a detail of the guide rail;

FIG. 11 a perspective view of another embodiment of the connecting link.

DETAILED DESCRIPTION OF THE PREFERRED EMBODIMENT

Figure 1:
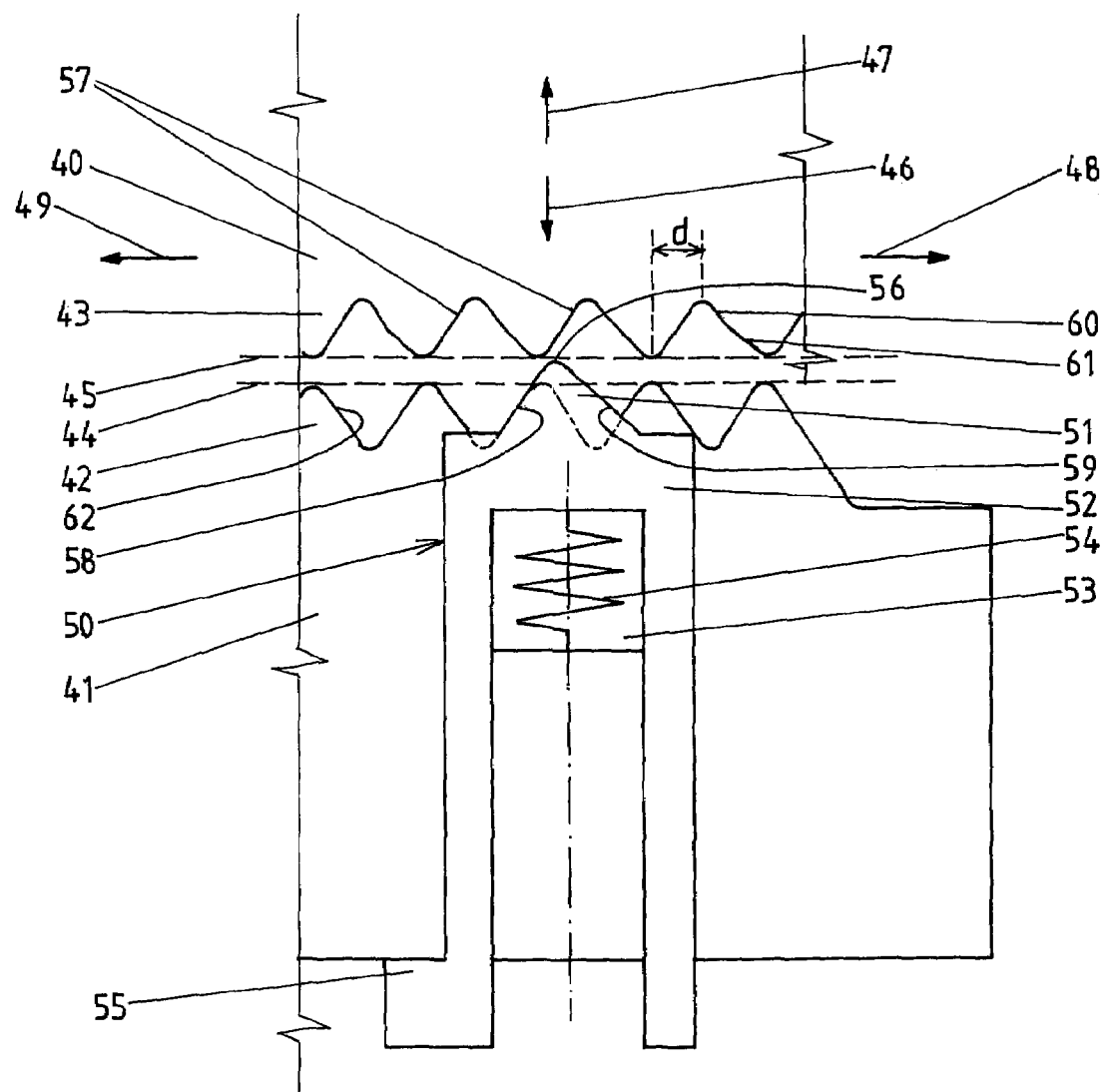
FIG. 1 a schematic view illustrating functioning of a locking device according to the present invention.

The functioning of a locking device according to the present invention will be explained with reference to FIGS. 1–3. Two components have arranged opposite each other toothings in form of the toothed racks 42, 43. The tips of the teeth of the two toothed racks 42, 43 lie in two plains 44, 45 respectively, extending parallel to each other. A clamping device, which is not shown in FIGS. 1–3, displaces one component 40 in directions, which are shown with arrows 46, 47, toward and away from another component 41. In the open position of the clamping device, the two toothed racks 42, 43 are spaced from each other (the distance between the two toothed racks is actually greater than that shown in FIG. 1). The component 40 is displaced in the direction shown with the arrows 46, 47 perpendicular to the planes 44, 45. The component 40 is also displaced, relative to the component 41, in directions shown with arrows 48, 49 substantially parallel to the longitudinal extent of the teeth (i.e., within 1–10° toward a horizontal) and parallel to the planes 44, 45. To this end, there are provided guide means, which are not shown in FIGS. 1–3, for the component 40 and/or the component 41. However, mainly, one of the components 40, 41 is stationary.

Upon closing of the clamping device, the component 40 is pressed in the direction of the arrow 46 toward the component 41 so that the teeth of the two toothed racks 42, 43 engage each other. In the positions of the two components 40, 41 shown in FIG. 1, the tips of the teeth of the two toothed racks 42, 43 are located directly opposite each other. This position is also called "head-to-head" position. Without specific measures, in this position of the two components 40, 41, a regular closing of the clamping device and engagement of the teeth of the two toothed racks 42, 43 are not possible.

An operating element 50 is supported in the component 41 for displacement in the directions parallel to the displacements of the two components toward an away from each other (in the directions shown with arrows 46, 47). The operational element 50 has a tooth 51 provided on a stem 52 having, in a side view, a U-shaped profile the side legs of which are connected by a bridging leg that carries the tooth 51. The stem 52 is displaceably supported in a recess formed in the component 41 and defining two hollows for passing of the side legs of the stem 52 and a larger hollow 53 in which the bridging leg of the stem 52 is displaceable. A spring 54 for biasing the bridging leg is located in the hollow 53. The spring 54 is formed as a helical spring. However, it can also be formed as a leaf spring. For limiting the outwardly preloaded position of the operating element 50, a stop 55 is provided on one of the side legs of the stem 52. The stop 55 is formed as a side projection of the side leg. There can be provided several springs 54. One or several springs 54 can act on the operating element 50 from another position via a lever.

In the outwardly preloaded position of the operating element 50, the tip 56 of the tooth 51 projects beyond the plane 44 of the tips of the teeth of the toothed rack 42. In the "head-to-head" position of the teeth of the toothed racks 42, 43 shown in FIG. 1, the tip 56 of the tooth 51 of the operating element 50 lies opposite a side flank 57 of one of the teeth of the toothed rack 43. A side offset of the tip 56 of the tooth 51 with respect to the tip of a tooth of the toothed rack 43 amounts to less than half of the distance d measured in the direction parallel to the plane 45 between a tip of a tooth of the toothed rack 43 and a valley between two teeth. Advantageously, this offset amounts to about one fourth of the distance d.

If starting form the position of the component 40 shown in FIG. 1, the component 40 is displaced in the direction of the arrow 46 toward the component 41, the tip 56 of the tooth 51 engages the side flank 57 of the respective tooth of the toothed rack 43, or the tip of the respective tooth of the toothed rack 43 engages a side flank 58 of the tooth 51 of the operating element 50, and the side flanks 57, 58 slide over each other as a result of a sidewise displacement of the component 40 in the direction of the arrow 49. The spring 54 should be of a strength sufficient for the sidewise displacement of the component 40 to be achieved as a result of the projection of the tip 56, without the tooth 51 moving inward against the biasing force of the spring 54.

Figure 2:
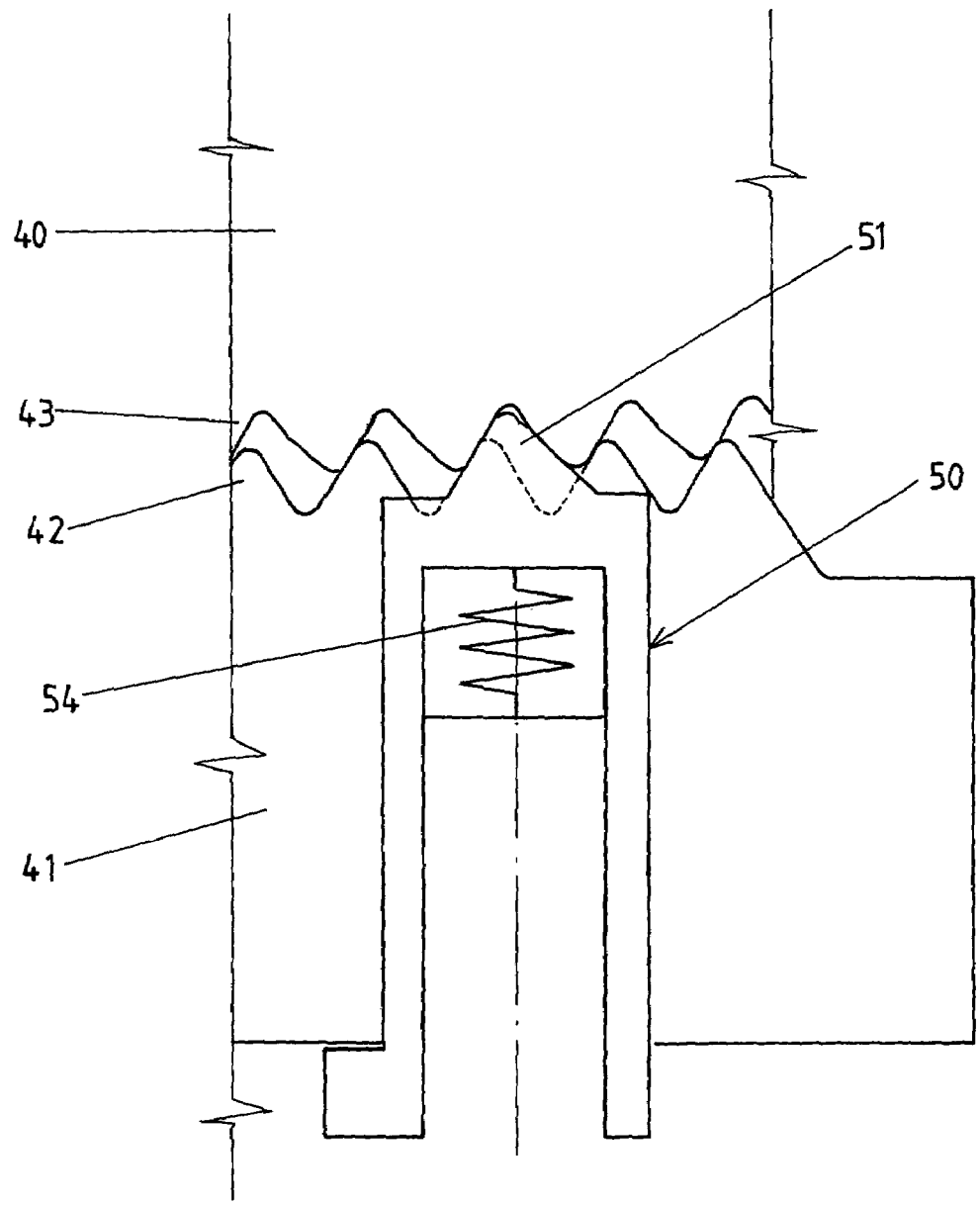
FIG. 2 a schematic view illustrating an aspect of functioning of the locking device according to the present invention.

FIG. 2 shows a position shortly before the tip 56 of the tooth 51 of the operating element 50 reaches the bottom of the valley between two respective teeth of the toothed rack 43. As soon as the tip 56 reaches the bottom of the valley between the two teeth, the tooth 51 is displaced inward against the biasing force of the spring 54 as a result of a further movement of the component 40 toward the component 41, which results in a further displacement of the component 40 in the direction of the arrow 49. In the end position of the components 40, 41, the toothed racks 40, 41 completely engage each other, as shown in FIG. 3. In this position of the components 40, 41, the tip 56 of the tooth 51 is located beneath the plane 44 of the tips of the teeth of the toothed rack 42.

The two side flanks 58, 59 of the tooth 51 of the operating element 50 have different inclinations. The side flank 59 is inclined to be a lesser degree than the side flank 58 which extends parallel to the side flank 57 of the tooth of the toothed rack 43. The other flank of the tooth of the tooth rack 43 has two sections 60, 61 also having different inclination, with the section 61 adjacent to the tooth root having a smaller inclination and extending parallel to the side flank 59 of the tooth 51 of the operating element 50. The sections 60 adjacent to the tips of the respective teeth extend parallel to the side flanks 62 of the teeth of the toothed rack 42, so that the sections 60 abut the side flanks 62 in the closed position of the clamping device. The two sections 60, 61 form an obtuse angle with each other. In case the components 40, 41 reach a position, before closing of the clamping device, in which the tip of one of the teeth of the toothed rack 43 is located opposite the less inclined flank 59 of the tooth 51 of the operating element 50, then upon closing of the clamping device, the less inclined section 61 of the tooth of the toothed rack 43 abuts the less inclined flank 59 of the tooth 51 of the operating element 50. As a result, the force components, which act in the direction perpendicular to the plane 44, i.e., in the direction of the displacement of the operating element 50, exceed the force components acting in a sidewise direction (in the direction shown with arrow 48). In this position of the components 40, 41, a sidewise displacement of the component 40 by the tooth 51 of the operating element 50 is not necessary. With the increase of force components in this displacement direction of the operating element 50, the pressing down of the tooth 51, upon movement of the components 40, 41 toward each other in the position discussed immediately above, is facilitated.

The less inclined section 61 of the teeth of the toothed rack 43 can, in principle, be eliminated, and the teeth of the toothed rack 43 can be formed in the same manner as the teeth of the toothed rack 42.

Instead of the single tooth 51, the operating element 50 can have two or more of such teeth which are aligned with respective teeth of the toothed rack 43. The tooth 51 of the operating element 50 can extend over a portion of or the entire length of the longitudinal extent of the teeth of the toothed rack 42 (perpendicular to the plane of the drawing in FIGS. 1–3). In the embodiment shown in FIGS. 1–3, the inclination of the side flank 58 of the tooth 51 corresponds to the inclination of the side flank of the tooth of the toothed rack 42 which is located on the same side.

Figure 3:
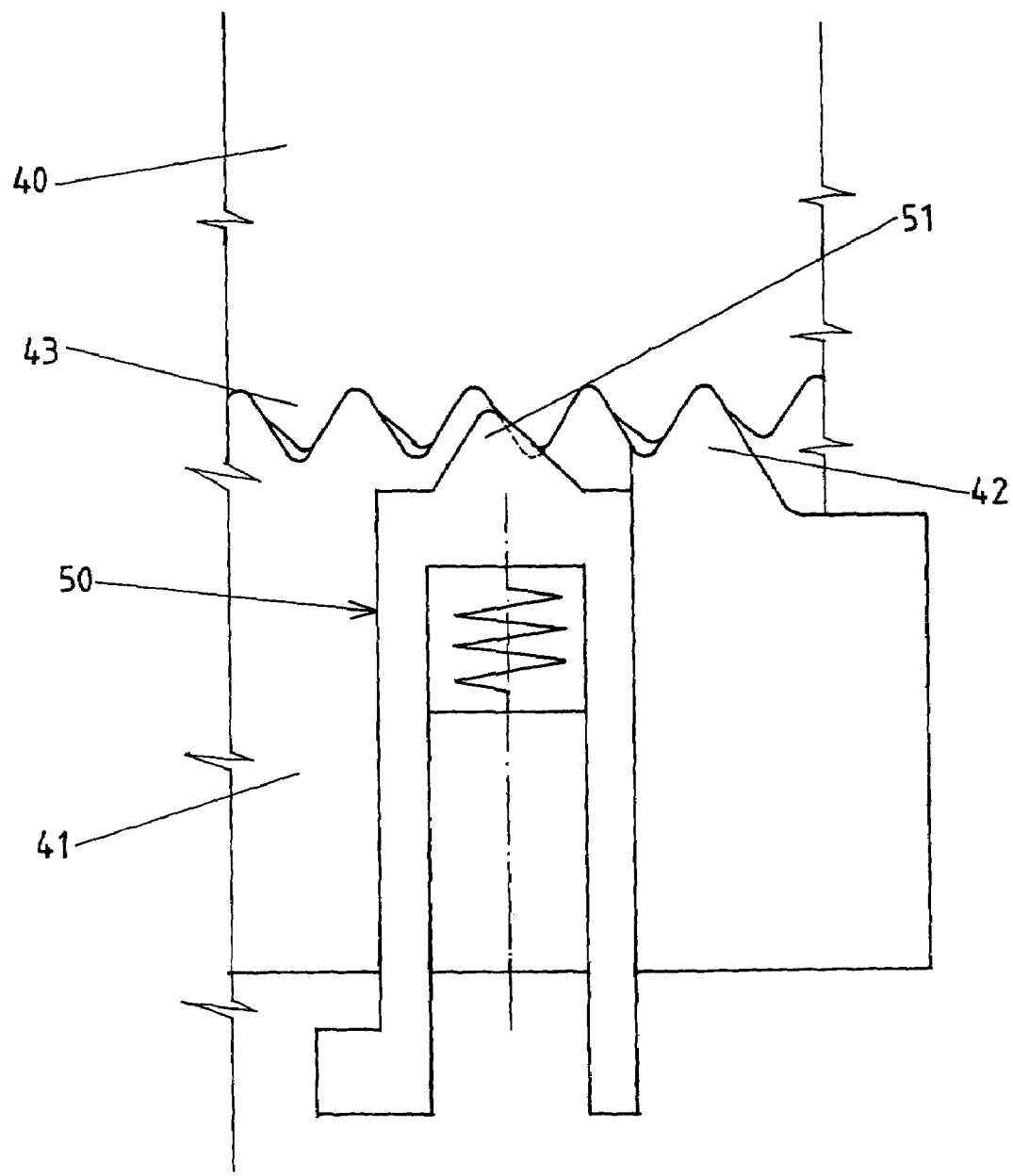
FIG. 3 a schematic view illustrating yet another aspect of functioning of the inventive locking device.

As it has already been pointed out above, FIGS. 1–3 show the invention only schematically. The elements for guiding the component 40 in the direction perpendicular to the longitudinal extent of the teeth of the toothed racks 42, 43, e.g., are not shown.

FIGS. 4–11 show, primarily schematically, the use of the locking device according to the present invention with a height and/or inclination and length adjustable steering column. The steering column includes a bracket 1 fixedly securable to a chassis. The bracket 1 has a vertical elongate opening 2 having a substantially H-shaped cross-section (FIG. 5). On one side of the bracket 1, there is arranged a guide rail 3 pivotable in a plane perpendicular to the plane of the drawing by a small degree about an axis located behind the plane of the drawing. The pivot axis lies parallel to the axis 4 of the bolt 5. The guide rail 3 has an undercut guide groove 6 in which a steering column tube 7 is supported in which a longitudinally adjustable, steering shaft 8 is arranged. The steering column tube 7 has a sidewise trapezoidal projection which the guide groove 6 formlockingly overlaps. A tubular axle 9 is fixedly secured to the guide rail 3 and extends through the elongate opening 2 in the bracket 1. An actuation lever 10 is pivotally supported on the tubular axle 9. The actuation lever 10 closely adjoins a stop 11 formed as a nut and secured on the tubular axle 9. On opposite sides of the actuation lever 10, there are provided two connecting links 12 and 13 axially displaceable along the tubular axle 9 but without a possibility of rotation relative thereto. One of the connecting links, the link 12 (FIG. 11), is formed as a pot-shaped member and is supported against a stop 15 by a spring package 14. The stop 15 is fixed at the end of the bolt 5 which extends through the tubular axle 9 and has its end projecting therefrom. The end surface 16 (FIG. 11) of this pot-shaped connecting link 12 is formed with a plurality of inclined surfaces engaging corresponding inclined surfaces of the actuation lever 10. Thus, the rotation of the actuation lever 10 about the tubular axle 9 or the axis 4 results in an axial displacement of the link 12 along the tubular axle 9.

The second connecting link 13 has two toothed racks 17 (FIG. 7) and a plurality of blind bores 18 which are provided between the two racks 17 and in which springs 19 are received. The springs 19 have one of their respective ends supported against a slide plate 20 which is supported against the bracket 1. The side of the link 13 adjacent to the actuation lever is likewise provided with inclined surfaces which abuts corresponding inclining surfaces provided on the actuation lever 10. The inclined surfaces of the links 12 and 13 and of the actuation lever 10 are so formed that upon rotation of the actuation lever in one direction, the two links 12, 13 are displaced away from each other. The toothed racks 17 of the link 13 engage the tooth racks 22 provided n the bracket 1.

In the steering column tube 7 and, in particular, in the section of the tube 7 received in the guide groove 6, there is provided an elongate opening 23 (FIG. 5) extending in the longitudinal direction of the steering column tube 5. The opening 23 is limited by toothed racks 24 which are provided on the steering column tube 7 and have each toothing 25 on its end surface adjacent to the tube inner side. The bolt 5, which projects through the opening 23 into the interior of the steering column tube 7, is connected with a profile or shaped member 26 which has a substantially T-shaped cross-section (FIG. 4), with toothed racks 7 being provided on the bottom side of the shaped member 26. The toothed racks 27 cooperate with the toothings 25 of the respective racks 24. Preloaded springs 28, which are supported against slide plates 67 (FIG. 4), are provided between the projecting shoulders of the shaped member 26 and the inner side of the steering column tube 7.

A clamping device for opening and closing the locking device is formed, in the embodiment shown in FIGS. 4–11, by the actuation lever 10, together with the connecting links 12, 13 and the bolt 5 displaceable within the tubular axle (9).

In its operational position, the actuation lever 10 occupies a position in which both connecting links are spaced from each other, the link 12 leftwardly and the link 13 rightwardly. As a result of this displacement, the toothings of the bracket 1 and the link 13 engage each other under the biasing force of springs 19. On the other hand, the link 12 acts, via the spring package 14, on the stop 15, pulling the bolt 5 leftwardly, and the shaped member 26 or its toothed racks 27 engage the toothings 25 of the toothed racks 24 provided at the edges of the elongate opening 23 of the steering column tube 7. Thereby, the steering column, which is formed of the steering column tube 7 and the steering shaft 8, is clamped to the bracket 1.

When the length of the steering column (perpendicular to the plane of the drawing of FIG. 5) and/or its inclination (in the direction of arrow 32 in FIG. 4) need to be adjusted, the actuation lever 10 is pivoted (perpendicular to the plane of the drawing of FIG. 4), so that the connecting links 12, 13 can be axially displaced. As a result, the preload of the springs 19 and 28 becomes effective, causing disengagement of respective toothings of toothed racks 17, 22 and 24 and 27. Upon disengagement, the steering column tube 7 can be displaced in its guide groove 6 and/or the guide rail 3 can be pivoted in the direction shown with the arrow 32. Upon the actuation lever 10 being pivoted in the opposite direction to its initial position, the links 12, 13 again move away form each other, preloading the springs 19, 28 and providing for locking of the steering column in its new position as a result of engagement of the respective toothed racks under the biasing force of the spring 19 and 28.

In order to insure a complete engagement in the "head-to-head" position of the teeth of respective toothed racks, at least one of the opposite toothed racks 24, 27, which provides for locking of the steering column in its longitudinal position, and/or at least one of the opposite toothed racks 17, 22, which provide for locking of the steering column in its height adjusted position, is/are provided with the operation element 50 according to the present invention and the functioning of which was described with reference to FIGS. 1–3, e.g., the operating element 50 having at least one tooth 51 is provided in one or both toothed racks 17 of the link 13 and in one or both toothed racks 27 of the shaped member 26.

In FIGS. 4–11, the operating element 50 is used for locking the steering column in its height-adjusted position. In the drawings, the connecting link 13 corresponds to the component 41 in FIGS. 1–3 (but is displaceable), and the bracket 1 forms the component 40 of FIGS. 1–3. The arrangement of the operating element 50 in the toothed racks 17 is shown in FIGS. 7–9. The operating element 50 is shown as a projecting arm 64 that extends into a housing 65. Between the arm 64 and the housing 65, there is provided a compression spring 54 that is located in a corresponding recess formed in the housing 65. For simplicity sake, the arms 64 and the housings 65 are not shown in FIGS. 4–5.

The operating element 50 can be arranged only in one of the two toothed racks. In this case, the teeth of the other toothed rack and the teeth of the toothed rack associated with the bracket 1 can be formed in conventional manner.

In order to prevent shearing of the component 41, i.e., of the link 13, the guiding of the component 41 or the link 13 should be effected with a small play. To this end, in the embodiment shown in the drawings, the link 13 is formed with guide surfaces 63 which cooperate with guide surfaces 66 of the bracket 1 (as shown in FIG. 5).

Instead of being arranged in the link 13, one or more of the operating elements 50 can be provided in the toothed racks 24 of the bracket 1.

Further, instead of providing two racks in the link 13 and two corresponding racks in the bracket 1, only one toothed rack can be provided in each of the two parts.

The operating elements 50 can also be provided, in a manner described above, in the toothed racks 24 and/or toothings 27.

Figure 12:
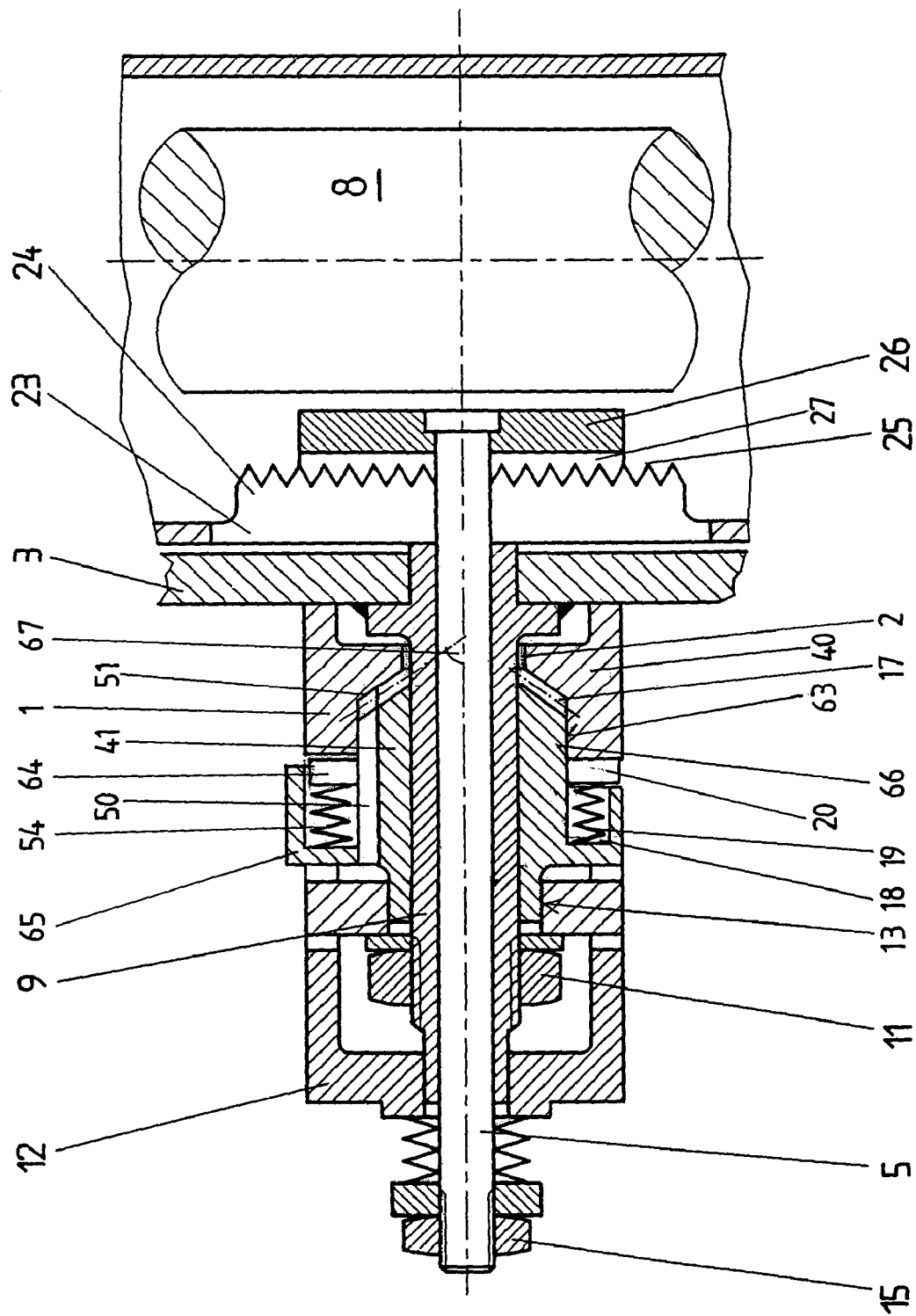
FIG. 12 a longitudinal cross-sectional view of another embodiment of a steering column with a locking device according to the present invention.

FIG. 12 shows a modified embodiment of a steering column with a locking device according to the present invention. In the embodiment shown in FIG. 12, the link 13 and the bracket 1 (components 40, 41) have, as in the previous embodiment) respective toothed racks 17, 22 provided on opposite sides of the bolt 5, but with the operating element 50 being provided only in one of the toothed racks 13. The respective planes of the tips of the teeth of both toothed racks 17 of the link 17 and of both toothed racks 22 of the bracket 1 are arranged at an obtuse angle to each other, forming a V-shaped profile, with the toothed racks 17 of the link 13 being provided on the outer side of the V-shaped profile and the toothed rack 22 on the inner side of the V-shaped profile. On the side of the link 13 and the bracket 1, which is opposite, with reference to the axis of the bolt 5, the operating element 50, respective cooperating guide surfaces 66, 63 are provided. With an angle 67, which is formed by the plane of the tips of the teeth of the toothed racks 17, 22 with the axis of the bolt 5, being less than 90°, upon displacement of the respective toothed racks toward each other and with the functioning operating element 50, a side force is applied to the link 13, component 41, providing for pressing of the guide surface 63 against the guide surface 66. Thereby, the rotation of the link 13 relative to the bracket 1 is prevented. Also, due to the inclined, with respect to the bolt axis, arrangement of the toothed racks 17, 22, the operational path of the tooth 51 of the operating element 50 is increased. Further, because of a relatively small distance of the toothed racks 17, 22 from the bolt axis, the force, which causes shearing of the teeth of the toothed racks 17 of the link 13 with respect to the teeth of the toothed racks 22 of the bracket 1, is reduced.

It is possible to form a reverse V-shaped profile, with the toothed racks of the bracket 1 being provided on the outer side of the V-shaped profile and with the toothed racks 17 of the link 13 being provided on the inner side of the V-shaped profile.

The toothed racks 24, 27 can be formed analogously, forming a V-shaped profile.

The present invention is not limited to the disclosed embodiments, e.g., the inventive operating member can be used with a steering column different from that shown in the drawings and in which the height-adjusted position is secured with tooth racks. For locking of the toothed racks, a clamping device is provided which can be formed differently from that used in connection with the present invention. Different embodiments of such steering columns are well known. The present invention can also be used with other devices having displaceable relative to each other parts which are locked in a desired position.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A locking device for two components displaceable relative to each other and each having a toothed rack with a plurality of teeth located next to each other, the toothed racks of the two components being arranged opposite each other, the locking device comprising:
   a clamping device which provides for movement of the two components toward each other whereby the teeth of the opposite toothed racks are brought into engagement with each other, and in an open position of which, the opposite toothed racks are spaced from each other and the two components can be displaced relative to each other; and
   at least one operating element displaceable against a spring biasing force and provided on at least one of the opposite toothed racks for preventing tips of the teeth of the opposite tooth racks from being located opposite each other during closing of the clamping device, the operating element having at least one tooth a tip of which projects beyond a plane of tips of the teeth of the at least one of the opposite racks in an outwardly preloaded position of the operating element, and is located opposite a side flank of a tooth of another of the opposite toothed racks when the tips of the teeth of the opposite racks are loaded directly opposite each other;
   wherein two side flanks of the at least one tooth of the operating element have at least in one section of their respective flank extensions, different inclinations, and wherein a side flank the one section of which is steeper, is located opposite a tip of a tooth of the another of the opposite toothed racks when the tips of the teeth of the opposite toothed racks are located directly opposite each other.

2. A locking device according to claim 1, wherein both side flanks of the teeth of the another of the toothed racks have, at least in one section of their respective flank extensions, different inclination, and wherein a side flank the one section of which is steeper, is located opposite a tip of the at least one tooth of the operating element when the tips of the teeth of the opposite toothed racks are located directly opposite each other.

3. A locking device according to claim 2, wherein in a side flank the one section of which is less steep, the less steep section adjoins a tip of a respective tooth and a steeper section adjoins a valley of the respective tooth.

4. A locking device according to claim 3, wherein the less steep section of a respective tooth of the another of the opposite toothed racks extends parallel to a flank with a less steep section of the at least one tooth of the operating element.

5. A locking device according to claim 3, wherein the steeper section extends parallel to a respective side flank of a respective tooth of the one of the opposite toothed racks.

6. A locking device according to claim 1, wherein the side flank with the steeper section of the at least one tooth of the operating element extends parallel to a side flank of a tooth of the another of the opposite toothed racks and abuts same upon displacement of the two components toward each other.

7. A locking device according to claim 6, wherein the side flank with the steeper section of the at least one tooth of the operating element in a side view, in a spaced apart position of the opposite racks coincides with a respective side flank of a respective tooth of the one of the opposite toothed racks and projects beyond the respective side flank.

8. A locking device for two components displaceable relative to each other and each having a toothed rack with a plurality of teeth located next to each other, the toothed racks of the two components being arranged opposite each other, the locking device comprising:
   a clamping device which provides for movement of the two components toward each other whereby the teeth of the opposite toothed racks are brought into engagement with each other, and in an open position of which, the opposite toothed racks are spaced from each other and the two components can be displaced relative to each other; and
   at least one operating element displaceable against a spring biasing force and provided on at least one of the opposite toothed racks for preventing tips of the teeth of the opposite toothed racks from being located opposite each other during closing of the clamping device, the operating element having at least one tooth a tip of which projects beyond a plane of tips of the teeth of the at least one of the opposite racks in an outwardly preloaded position of the operating element, and is located opposite a side flank of a tooth of another of the opposite toothed racks when the tips of the teeth of the opposite racks are located directly opposite each other;
   wherein the clamping device comprises a bolt an axis of which extends parallel to a direction of displacement of the two components toward and away from each other, and wherein planes of the tips of the teeth of the opposite tooth racks form with the bolt axis an angle that deviates from a right angle.

9. A locking device according to claim 8, wherein the two components have toothed racks arranged on opposite side of the bolt, wherein the at least one operating element is provided only in one of the opposite toothed racks of the two components and located on one side of the bolt, and wherein the planes of the tips of two toothed racks of a respective component from together a V-shaped profile in a longitudinal direction extending parallel to a longitudinal extension of the teeth and parallel to the bolt axis.

10. A locking device according to claim 9, wherein on a side of the two components opposite, with respect to the bolt axis, the at least one operating member, cooperating guide surfaces are provided.

11. A locking device for two components displaceable relative to each other and each having a toothed rack with a plurality of teeth located next to each other, the toothed racks of the two components being arranged opposite each other, the locking device comprising:
 a clamping device which provides for movement of the two components toward each other whereby the teeth of the opposite toothed racks are brought into engagement with each other, and in an open position of which, the opposite toothed racks are spaced from each other and the two components can be displaced relative to each other; and
 at least one operating element displaceable against a spring biasing force and provided on at least one of the opposite toothed racks for preventing tips of the teeth of the opposite toothed racks from being located opposite each other during closing of the clamping device, the operating element having at least one tooth a tip of which projects beyond a plane of tips of the teeth of the at least one of the opposite racks in an outwardly preloaded position of the operating element, and is located opposite a side flank of a tooth of another of the opposite toothed racks when the tips of the teeth of the opposite racks are located directly opposite each other.

12. A locking device according to claim 11, wherein the two components form parts of a height-adjustable or inclination and length-adjustable steering column.

13. A locking device according to claim 11, wherein the at least one operating element is formed as a stem extending in a recess in the at least one of the opposite toothed racks, wherein the at least one tooth is provided at a free end of the stem, and wherein the stem has a longitudinal axis and is arranged in the recess for displacement in a direction of the longitudinal axis thereof.

14. A locking device according to claim 13, comprising a compression spring for biasing the stem, in the open position of the clamping device, to the outwardly preloaded position thereof limited by a stop.

15. A locking device according to claim 14, wherein the compression spring has a biasing force strong enough that, upon the tip of the at least one tooth of the operating element engaging the side flank of the tooth of the another of the opposite toothed racks during closing of the clamping device, with the tips of the teeth of the opposite toothed racks lying directly opposite each other, the two components are displaced relative to each other in a direction parallel to the plane of the tips of the teeth of the at least one of the opposite toothed racks, without the at least one tooth of the operating element being displaced inwardly until the tip of the at least one tooth reaches a bottom of a valley between respective teeth of the another of the opposite toothed racks.

16. A locking device according to claim 11, wherein in a position of the opposite toothed racks in which the tips of the teeth thereof are located directly opposite each other, the tip of the at least one tooth of the operating element is offset, in a direction parallel to a plane of tips of the teeth of the another of the opposite toothed racks, from a tip of the tooth of the another of the opposite toothed racks opposite the side flank of which it is located, by less than a half of a distance between a tip of a tooth of the another of the opposite toothed racks and a valley between two teeth of the another of the opposite toothed racks measured in the direction parallel to the plane of the tips of the teeth of the another of the opposite toothed racks.

17. A locking device according to claim 16, wherein an offset between the tip of the at least one tooth of the operating element and the tip of the tooth of the another of the opposite toothed racks amounts to one fourth of the distance between the tip of a tooth of the another of the opposite toothed racks and the valley between the two teeth.

18. A locking device according to claim 11, wherein the clamping device comprises a bolt an axis of which extend parallel to a direction of displacement of the two components toward and away from each other.

19. A locking device according to claim 11, wherein the at least one operating element is supported in a component, which is associated with the one of the opposite toothed racks, for displacement in a direction parallel to a direction of displacement of the two components toward and away from each other.

20. A locking device according to claim 11, wherein the at least one operating element has several teeth side flanks of which extend parallel to each other and tips of which are spaced from each other by a distance corresponding to one of a distance between the tips of the teeth of the one of the opposite toothed racks and a multiple of the distance between the tips of the teeth of the one of the opposite toothed racks.

21. A locking device for two components displaceable relative to each other and each having a toothed rack with a plurality of teeth located next to each other, the toothed racks of the two components being arranged opposite each other, the locking device comprising:
 a clamping device which provides for movement of the two components toward each other whereby the teeth of the opposite toothed racks are brought into engagement with each other, and in an open position of which, the opposite toothed racks are spaced from each other and the two components can be displaced relative to each other; and
 at least one operating element displaceable against a spring biasing force and provided on at least one of the opposite toothed racks for preventing tips of the teeth of the opposite toothed racks from being located opposite each other during closing of the clamping device, the operating element having at least one tooth a tip of which projects beyond a plane of tips of the teeth of the at least one of the opposite racks in an outwardly preloaded position of the operating element, and is located opposite a side flank of a tooth of another of the opposite toothed racks when the tips of the teeth of the opposite racks are located directly opposite each other;
 wherein the component with the at least one toothed rack has a recess, and the operating element is arranged in the recess for displacement in a direction perpendicular to the plane of tips of the teeth of the at least one of the opposite toothed racks.

22. A locking device for two components displaceable relative to each other and each having a toothed rack with a plurality of teeth located next to each other, the toothed racks of the two components being arranged opposite each other, the locking device comprising:
 a clamping device which provides for movement of the two components toward each other whereby the teeth of the opposite toothed racks are brought into engagement with each other, and in an open position of which, the opposite toothed racks are spaced from each other and the two components can be displaced relative to each other; and at least one operating element displaceable against a spring biasing force and provided on at least one of the opposite toothed racks for preventing tips of the teeth of the opposite toothed racks from being located opposite each other during closing of the clamping device, the operating element having at least one tooth a tip of which projects beyond a plane of tips of the teeth of the at least one of the opposite racks in an outwardly preloaded position of the operating element, and is located opposite a side flank of a tooth of another of the opposite toothed racks when the tips of the teeth of the opposite racks are located directly opposite each other;

wherein a radius of the tip of the at least one tooth of the operating element substantially corresponds to a radius of the bottom of a valley between two adjacent teeth of the another of the opposite toothed racks.

* * * * *